(12) United States Patent
Wang et al.

(10) Patent No.: US 9,193,839 B2
(45) Date of Patent: Nov. 24, 2015

(54) CROSSLINKING CONTROL IN HIGH IMPACT POLYSTYRENE MANUFACTURING PROCESS

(71) Applicant: FINA TECHNOLOGY, INC., Houston, TX (US)

(72) Inventors: Wei Wang, League City, TX (US); David Knoeppel, League City, TX (US); Madison Bluhm, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 14/211,387

(22) Filed: Mar. 14, 2014

(65) Prior Publication Data

US 2015/0259481 A1    Sep. 17, 2015

(51) Int. Cl.
*C08L 23/10* (2006.01)
*C08J 3/24* (2006.01)

(52) U.S. Cl.
CPC ............... *C08J 3/24* (2013.01); *C08J 2325/06* (2013.01)

(58) Field of Classification Search
CPC ............ C08F 8/30; C08F 8/32; C08F 257/02
USPC .................. 525/193, 194, 242, 379
See application file for complete search history.

(56) References Cited

U.S. PATENT DOCUMENTS

| | | | |
|---|---|---|---|
| 3,405,107 A | 10/1968 | Matthews et al. | |
| 3,476,829 A | 11/1969 | Gruver et al. | |
| 4,125,695 A | 11/1978 | Kamath | |
| 4,154,777 A | 5/1979 | Shoji et al. | |
| 4,454,271 A * | 6/1984 | Cooper et al. | 525/132 |
| 4,777,210 A | 10/1988 | Sosa et al. | |
| 4,877,826 A | 10/1989 | Beyer | |
| 5,428,106 A * | 6/1995 | Schrader et al. | 525/71 |
| 5,844,029 A * | 12/1998 | Prabhu et al. | 524/236 |
| 6,972,311 B2 * | 12/2005 | Chevillard et al. | 526/346 |
| 2006/0110559 A1 | 5/2006 | Nasreddine et al. | |
| 2012/0252975 A1 | 10/2012 | Tomlinson et al. | |

FOREIGN PATENT DOCUMENTS

| | | |
|---|---|---|
| CN | 101899135 A | 12/2010 |
| GB | 1416405 A | 12/1975 |
| WO | 2013054353 A1 | 4/2013 |

OTHER PUBLICATIONS

International Search Report and Written Opinion issued in PCT/US15/20123, dated Jun. 10, 2015, 10 pages.

* cited by examiner

*Primary Examiner* — Nathan M Nutter

(57) ABSTRACT

The method includes providing a high impact polystyrene (HIPS) reaction system, wherein the HIPS reaction system has a devolitalizer downstream of a reactor and injecting a retarding agent into the HIPS reaction system prior to the devolitalizer.

19 Claims, 3 Drawing Sheets

CROSSLINKING CONTROL IN HIGH IMPACT POLYSTYRENE MANUFACTURING PROCESS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

The present disclosure relates to the production of high impact polystyrene and other elastomer-reinforced polymers of vinylaromatic compounds (collectively "HIPS").

2. Background

Elastomer-reinforced polymers of vinylaromatic compounds—HIPS—such as styrene, alpha-methylstyrene and ring-substituted styrene have found widespread commercial use. For example, elastomer-reinforced styrene polymers having discrete particles of cross-linked elastomer dispersed throughout the styrene polymer matrix can be useful for a range of applications including food packaging, office supplies, point-of-purchase signs and displays, housewares and consumer goods, building insulation, and cosmetics packaging. The incorporation of an elastomer into the styrene matrix results in improvements in a range of physical and mechanical properties (e.g., impact strength) and collectively these polymers are termed high-impact polystyrenes.

The utility of a particular HIPS depends on the polymer having some combination of mechanical, thermal, and/or physical properties that render the material suitable for a particular application. These properties are related in part to the extent of incorporation of the elastomeric material into the polymer matrix. Many factors during polymerization can affect the properties of polymer. Once such factor is the degree of crosslinking in the rubber phase, which may result in decreased impact resistance, and environmental stress cracking resistance, which may be reflected by a lower swell index.

Some crosslinking may be desired for low to medium viscosity rubber to stabilize the rubber particle morphology through the devolatilization process. However, excess crosslinking may alter the elasticity of elastomer phase and be detrimental to the final properties of HIPS such as impact strength and environmental stress cracking resistance. An example of a relationship between rubber crosslinking density and ESCR is illustrated in FIG. 1, where the crosslinking density is indirectly measured by swelling index and ESCR by the residual strain at failure.

SUMMARY

A method is disclosed. The method includes providing a high impact polystyrene (HIPS) reaction system, wherein the HIPS reaction system has a devolatilizer downstream of a reactor and injecting a retarding agent into the HIPS reaction system prior to the devolatalizer.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
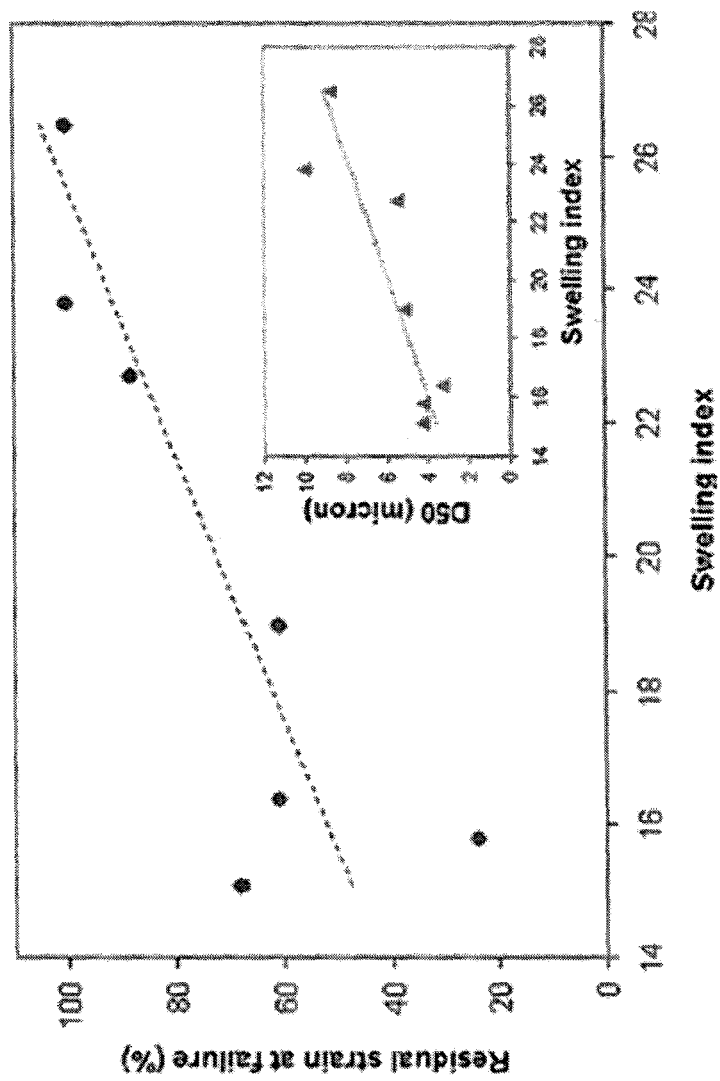
FIG. 1 is a graph depicting residual strain at failure (%) versus swelling index as found in Journal of Applied Polymer Science 121, 2011, 1697.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

HIPS refers to any elastomer-reinforced vinylaromatic polymers. The vinylaromatic monomers may include, but are not limited to, styrene, alpha-methylstyrene and ring-substituted styrene. HIPS may further include comonomers, including methylstyrene; halogenated styrenes; alkylated styrenes; acrylonitrile; esters of (meth)acrylic acid with alcohols having from 1 to 8 carbons; N-vinyl compounds such as vinylcarbazole, maleic anhydride; compounds which contain two polymerizable double bonds such as divinylbenzene or butanediol diacrylate; or combinations thereof. The comonomer may be present in an amount effective to impart one or more user-desired properties to the composition. Such effective amounts may be determined by one of ordinary skill in the art with the aid of this disclosure. For example, the comonomer may be present in the styrenic polymer composition in an amount of from 1 wt. % to 99.9 wt. % by total weight of the reaction mixture, alternatively from 1 wt. % to 90 wt. %, alternatively from 1 wt. % to 50 wt. %.

The elastomeric material is typically embedded in the polystyrene matrix. Examples of elastomeric materials include conjugated diene monomers include without limitation 1,3-butadiene, 2-methyl-1,3-butadiene, 2-chloro-1,3 butadiene, 2-methyl-1,3-butadiene, and 2-chloro-1,3-butadiene. Alternatively, the HIPS includes an aliphatic conjugated diene monomer as the elastomer. Without limitation, examples of suitable aliphatic conjugated diene monomers include $C_4$ to $C_9$ dienes such as butadiene monomers. Blends or copolymers of the diene monomers may also be used. Likewise, mixtures or blends of one or more elastomers may be used. In an embodiment, the elastomer comprises a homopolymer of a diene monomer, alternatively, the elastomer comprises polybutadiene. The elastomer may be present in the HIPS in amounts effective to produce one or more user-desired properties. Such effective amounts may be determined by one of ordinary skill in the art with the aid of this disclosure. For example, the elastomer may be present in the HIPS in an amount of from 1 wt. % to 20 wt. %, alternatively from 2 wt. % to 15 wt. %, alternatively 5 wt. % to 11 wt. % based on the total weight of the HIPS.

In an embodiment, a HIPS suitable for use in this disclosure may have a melt flow rate of from 1 g/10 min. to 40 g/10 min., alternatively from 1.5 g/10 min. to 20 g/10 min., alternatively from 2 g/10 min. to 15 g/10 min as determined in accordance with ASTM D-1238; a falling dart impact of from 5 in-lb to 200 in-lb, alternatively from 50 in-lb to 180 in-lb, alternatively from 100 in-lb to 150 in-lb as determined in accordance with ASTM D-3029; an Izod impact of from 0.4 ft-lbs/in to 5 ft-lbs/in, alternatively from 1 ft-lbs/in to 4 ft-lbs/in, alternatively from 2 ft-lbs/in to 3.5 ft-lbs/in as determined in accordance with ASTM D-256; a tensile strength of from 2,000 psi to 10,000 psi, alternatively from 2,800 psi to 8,000 psi, alternatively from 3,000 psi to 5,000 psi as determined in accordance with ASTM D-638; a tensile modulus of from 100,000 psi to 500,000 psi, alternatively from 200,000 psi to 450,000 psi, alternatively from 250,000 psi to 380,000 psi as determined in accordance with ASTM D-638; an elongation of from 0.5% to 90%, alternatively from 5% to 70%, alternatively from 35% to 60% as determined in accordance with ASTM D-638; a flexural strength of from 3,000 psi to 15,000 psi, alternatively from 4,000 psi to 10,000 psi, alternatively from 6,000 psi to 9,000 psi as determined in accordance with ASTM D-790; a flexural modulus of from 200,000 psi to 500,000 psi, alternatively from 230,000 psi to 400,000 psi, alternatively from 250,000 psi to 350,000 psi as determined in accordance with ASTM D-790; an annealed heat distortion of from 180° F. to 215° F., alternatively from 185° F. to 210° F., alternatively from 190° F. to 205° F. as determined in accordance with ASTM D-648; a Vicat softening of from 195° F. to 225° F., alternatively from 195° F. to 220° F., alternatively from 200° F. to 215° F. as determined in accordance with ASTM D-1525; and a gloss 60° of from 30 to 100, alternatively from 40 to 98, alternatively from 50 to 95 as determined in accordance with ASTM D-523.

In an embodiment, the polymerization reaction to form HIPS may be carried out in a solution or mass polymerization process. Mass polymerization, also known as bulk polymerization refers to the polymerization of a monomer in the absence of any medium other than the monomer and a catalyst or polymerization initiator. Solution polymerization refers to a polymerization process in which the monomers and polymerization initiators are dissolved in a non-monomeric liquid solvent at the beginning of the polymerization reaction. The liquid is usually also a solvent for the resulting polymer or copolymer.

The polymerization process can be either batch or continuous. In an embodiment, the polymerization reaction may be carried out using a continuous production process in a polymerization apparatus comprising a single reactor or a plurality of reactors. For example, the polymeric composition can be prepared using an upflow reactor. Reactors and conditions for the production of a polymeric composition are disclosed in U.S. Pat. No. 4,777,210, which is incorporated by reference herein in its entirety.

In yet another embodiment, the polymerization reaction may be carried out in a plurality of reactors with each reactor having an optimum temperature range. For example, the polymerization reaction may be carried out in a reactor system employing a first and second polymerization reactor that are either continuously stirred tank reactors (CSTR) or plug-flow reactors. In an embodiment, a polymerization reactor for the production of HIPS of the type disclosed herein comprising a plurality of reactors may have a first reactor (e.g., a CSTR), also known as the prepolymerization reactor, and a second reactor (e.g., CSTR or plug flow).

The product effluent from the first reactor may be referred to herein as the prepolymer. When the prepolymer reaches the desired conversion, it may be passed through a heating device into a second reactor for further polymerization. The polymerized product effluent from the second reactor may be further processed and is described in detail in the literature. Upon completion of the polymerization reaction, HIPS is recovered from the second reactor and subsequently processed such as through devolitalization, Without being bound by theory, it is believed that a crosslinking reaction may occur in the elastomeric phase when the polymer melt runs through the devolitalization section of polymerization reactor. The exposure to the relatively high temperature in the devolitalization section (including the devolitalization preheater) may initiate the crosslinking of the elastomeric material, such as polybutadiene chains, through a free radical mechanism.

In one embodiment of the present disclosure, the number of crosslinking (as measured by the swell index of HIPS) may be controlled by addition of a retarding chemical agent to the polymer melt prior to the devolitalization section to slow the crosslinking reaction. In certain embodiments of the present disclosure, due to the free radical nature of the crosslinking reaction, the crosslinking retarder can be a chain transfer agent. In an embodiment, the chain transfer agent may be a mercaptan, thiol, or halocarbon, such as carbon tetrachloride, and combinations thereof. Examples of mercaptan chain transfer agents include n-octyl mercaptan, t-octyl mercaptan, n-decyl mercaptan, n-dodecyl mercaptan (NDM), t-dodecyl mercaptan, tridecyl mercaptan, tetradecyl mercaptan, n-hexadecyl mercaptan, t-nonyl mercaptan, ethyl mercaptan, isopropyl mercaptan, t butyl mercaptan, cyclohexyl mercaptan, benzyl mercaptan and mixtures thereof. Ethylbenzene is another alternative as a retarder chain transfer agent. In certain embodiments of the present disclosure, the concentration of the chain transfer agent added to the polymer melt is between 50 and 150 ppm (by weight), 50 and 1000 ppm (by weight) or by between 1 ppm and 1% (by weight). Alternatively, the retarder can be a free radical scavenger such as a phenolic antioxidant. The retarder can also be a crosslinking coagent, chosen from a polyfunctional (meth)acrylic monomer, allylic compound or metal salt of unsaturated monocarboxylic acids. Use of crosslinking coagents with phenolic retarders not only delays the scorching in the elastomeric phase but also reduces the elastic modulus and increases elongation of rubber. The retarder may also improve the rubber utilization efficiency and physical properties of HIPS. The chosen crosslinking retarding agent can be one of chain transfer agents, free radical scavengers or coagents or any combination of those. In certain embodiments of the present disclosure, the concentration of the crosslinking agent added to the polymer melt is between 50 and 150 ppm (by weight), 50 and 1000 ppm (by weight) or by between 1 ppm and 1% (by weight).

In another embodiment of the present disclosure, the retarding agent is a tertiary amine oxide, such as N,N,N-trialkylamine oxide, wherein at least one N is a methyl group and remaining Ns are C14-C24 saturated aliphatic chains. In one embodiment of the present disclosure, one N is a methyl group and the other two Ns are C14-C24 saturated aliphatic chains. In certain embodiments, the tertiary amine oxide can be injected prior to the devolitalizer with the use of a solvent such as an aliphatic or aromatic solvent. Examples include heptanes or ethylbenzene, respectively. The tertiary amine oxide/solvent solution may be homogenous or a suspension.

In certain embodiments of the present disclosure, the concentration of the tertiary amine oxide added to the polymer melt is between 50 and 150 ppm (by weight), 50 and 1000 ppm (by weight) or by between 1 ppm and 1% (by weight).

In still another embodiment, in place of the tertiary amine oxide, a tertiary amine could be used as the retarding agent. While not bound by theory, it is believed that with the presence of peroxides and oxygen and under high temperatures, the tertiary amine oxides is formed from the corresponding amine. An example of such a tertiary amine is 2,6-di-tert-butyl-4-(dimehtylamino)methylphenol. In certain embodiments of the present disclosure, the concentration of the tertiary amine added to the polymer melt is between 50 and 150 ppm (by weight), 50 and 1000 ppm (by weight) or by between 1 ppm and 1% (by weight).

In certain embodiments of the present disclosure, the swell index of the HIPS is improved to 15 to 25 over that when no retardant is used.

In an embodiment, the HIPS may also comprise additives as deemed necessary to impart desired physical properties, such as, increased gloss or color. Examples of additives include without limitation stabilizers, talc, antioxidants, UV stabilizers, lubricants, plasticizers, ultra-violet screening agents, oxidants, anti-oxidants, anti-static agents, ultraviolet light absorbents, fire retardants, processing oils, mold release agents, coloring agents, pigments/dyes, fillers, and the like. The aforementioned additives may be used either singularly or in combination to form various formulations of the composition. For example, stabilizers or stabilization agents may be employed to help protect the polymeric composition from degradation due to exposure to excessive temperatures and/or ultraviolet light. The additives may be added after recovery of the HIPS, for example during compounding such as pelletization.

These additives may be included in amounts effective to impart the desired properties. Effective additive amounts and processes for inclusion of these additives to polymeric compositions are known to one skilled in the art. For example, the additives may be present in an amount of from 0.1 wt. % to 50 wt. %, alternatively from 1 wt. % to 40 wt. %, alternatively from 2 wt. % to 30 wt. % based on the total weight of the composition.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

HIPS batch polymerization was run to test the effectiveness of Saret SR516, a mixture of coagent and scorch retarder acquired from Sartomer. The HIPS batch polymerization was run according to the formulation and conditions as listed in Table 1. The SR516 (1000 ppm relative to the feed by weight) was pre-dissolved in ethylbenzene (EB) and added into the reaction mixture 15 minutes before the polymer reaction ends at the targeted conversion (70~75%). After the batch reaction, the polymer was devolatilized (to remove residual monomers and other volatile compositions) in a vacuum oven at 225° C. and pressures less than 10 torr. The devolitalized final polymer was then submitted for swell index measurements.

TABLE 1

Formulation and Run Conditions of HIPS Batch Polymerization

| | |
|---|---|
| RPM | 150 |
| Initiator Type | Lupersol 233-M75 |
| Temperature Profile (° C.) | 110 (30 min), 130 (3 h), 150 (1 h) Or 70% conversion reached |
| Initiator Concentration (ppm) | 225 |
| Styrene (wt %) | 91.6 |
| Rubber Feed Concentration (wt %)* | 6.4 (Lanxess Taktene 550 or Firestone D55) |
| Mineral Oil in Feed (wt. %) | 2.0 |
| Irganox 1076 (ppm) | 800 |

*Rubber concentration in the final polymer depends on the eventual conversion after polymerization and devol.

Rubber crosslinking in HIPS was evaluated by swelling of the gel phase in toluene. The gel phase represents a mixture of PS-grafted PB, partially crosslinked PB and PS occluded within rubber particles, which is determined after removal of the PS matrix by solubilization. The swelling index is used here as an indirect measurement of the rubber crosslinking density, i.e., the higher the swelling, the lower the PB crosslinking.

Figure 2:
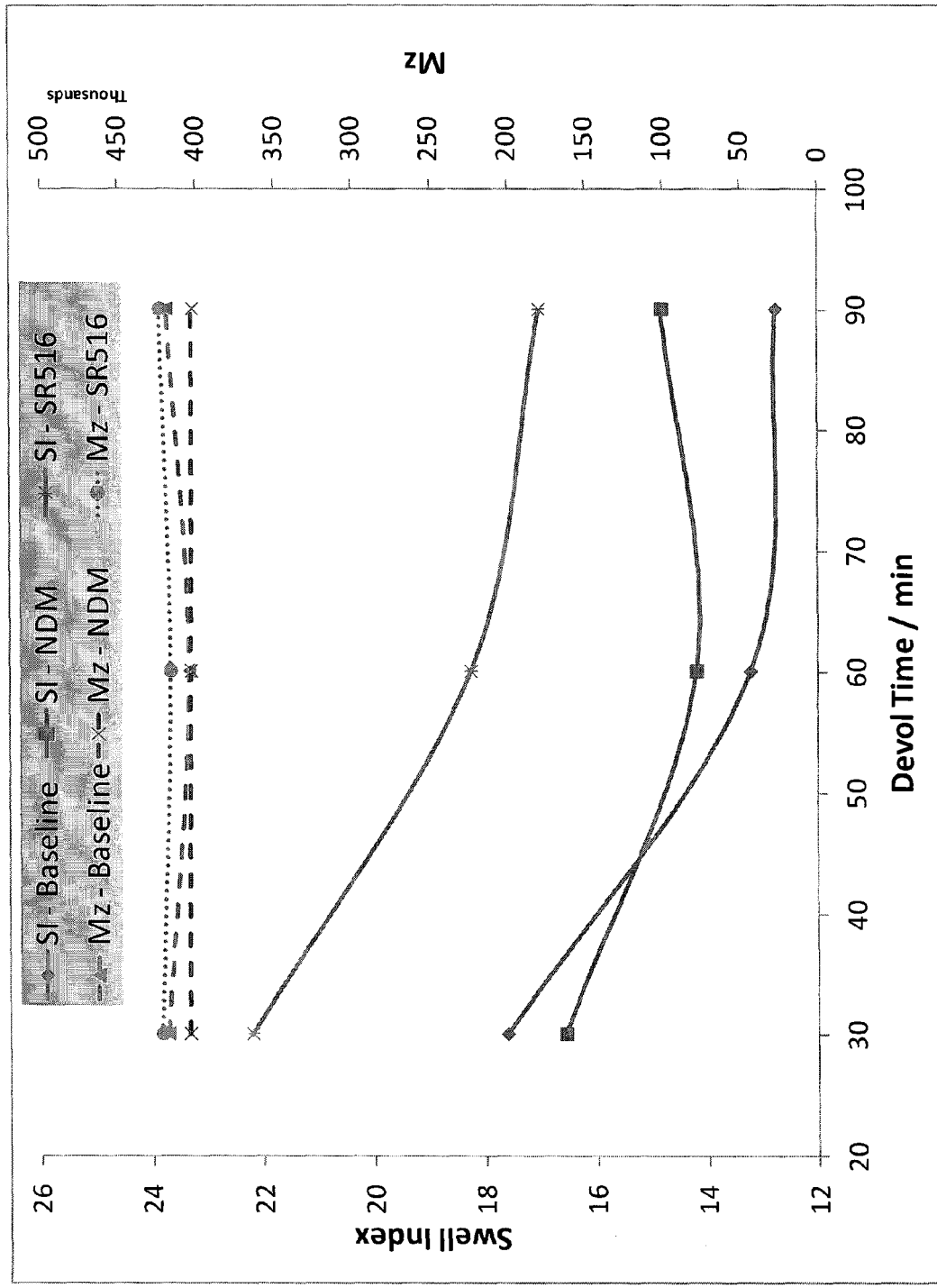
FIG. 2 is a graph depicting devolitalization time in minutes versus swell index and Mz consistent with the disclosure of Example 1.

In a separate run, SR516 was replaced by NDM and all other procedures remained the same. Compared to the baseline reaction without the use of retarding agent, both SR516 and NDM experiments showed higher swell indices (a gauge of crosslinking in rubber particles of HIPS) with devolitalization time. The swell index from the SR516 batch reaction was consistently higher at all three devolitalization times. The GPC results confirmed that the molecular weights of the polystyrene phase from SR516 reaction were consistent with the baseline reaction while the NDM run led to lower molecular weights as expected. The results of Example 1 may be found in FIG. 2.

Example 2

HIPS batch reactions similar to Example 1 were run to test the effectiveness of 2,6-di-tert-butyl-4-(dimethylamino)methyl phenol (or, aminomethylphenol). In one experiment, 50 ppm (relative to the feed) of aminomethylphenol (dissolved in EB) was delivered into the HIPS reaction 15 min before the end of reaction and prior to the devol. The swell index was monitored with the devolitilzation time, as an indirect measure of rubber crosslinking density change through the devolitilzation process. With the addition of aminomethylphenol, the swell index of rubber particles stayed above 16 through the 90 min of devolitilzation. Compared to the control (without the use of retarding chemical agent), the aminophenol showed an obvious crosslinking retarding performance. In another experiment, a higher concentration of aminomethylphenol (1000 ppm, relative to the feed) was added into the reaction. No gels of rubber were recovered after centrifugation and the swell index could not be measured.

The effect of aminomethylphenol concentration on the rubber crosslinking was also studied. The results showed (FIG. 3) that 50~100 ppm of aminophenol was able to increase the swell index up to 5 units even at the longest devolitilzation time. Use of a lower concentration led to a decreased effect on the swell index. On the other side, a higher concentration of aminophenol gave a swell index as high as 32. The results were consistent with the earlier observation that when 1000 ppm of aminophenol was used, no swell index could be measured, even at the longest devolitilzation time (90 min)

Figure 3:
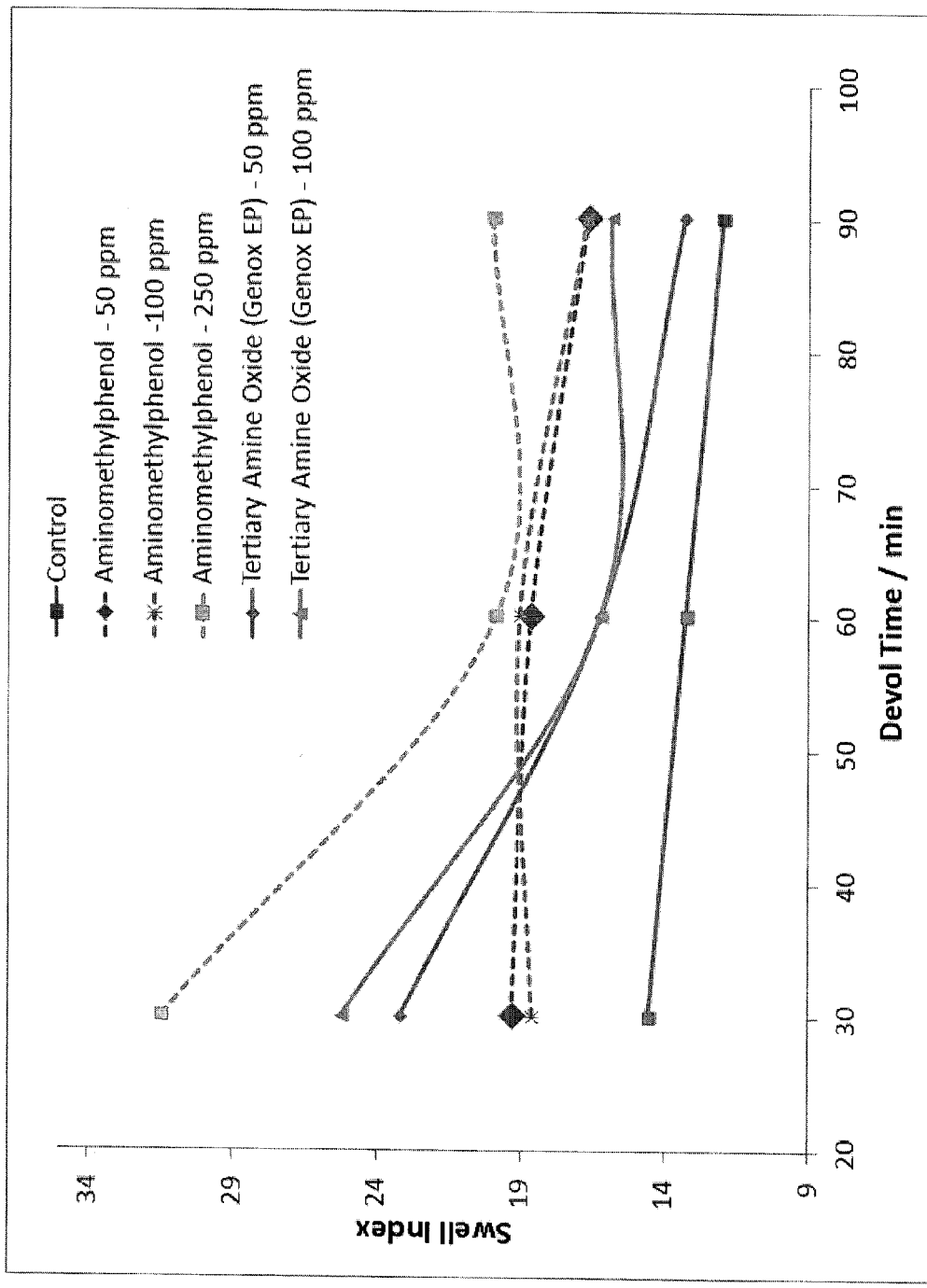
FIG. 3 is a graph depicting devolitalization time in minutes versus swell index consistent with the disclosure of Example 2.

To study the effect of tertiary amine oxide, a selected, aliphatic tertiary amine oxide, N,N,N-trialkylamine oxide (CAS#204933-93-7), was tested in batch polymerizations. At a concentration of 50~100 ppm (relative to the feed), the aliphatic amine oxide gave a swell index improvement, comparable to the efficacy of aminomethylphenol, after 90 min of devolitilzation. The effectiveness of this aliphatic amine oxide seemed even better at shorter devol time (FIG. 3). Further lab studies of the tertiary amine oxide revealed that the addition of tertiary amine oxide in the feed did not seem to improve the swell index as did the later-stage addition of the chemical in polymerization.

Example 3

A HIPS batch was run with 50 ppm (relative to the feed) of aminomethylphenol (dissolved in EB) delivered into the reaction 15 min before the end of batch polymerization. Use of aminomethylphenol was able to improve the swell index almost 5 units compared to the control polymerization where no aminomethylphenol was added (Table 2). GPC measurements showed that the molecular weights of HIPS involving aminomethylphenol was close to the control polymerization. The tensile elongation and impact resistance of HIPS with higher swell index were improved.

TABLE 2

Physical Properties of HIPS Prepared Using Aminomethylphenol (90 min in devolitilization)

|  | Control | 50 ppm aminomethylphenol |
|---|---|---|
| Mn | 120,840 | 123,863 |
| Mw | 260,517 | 255,939 |
| Mz | 410,142 | 397,981 |
| Polydispersity | 2.2 | 2.1 |
| Peak MW | 252,092 | 234,226 |
| Swell Index | 12.7 | 18.5 |
| Gel Content (%) | 29.6 | 24.4 |
| Rubber Content (% by conversion) | 11.1 | 10.4 |
| Rubber Content (% by titration) | 11.5 | 10.8 |
| Gel/Rubber | 2.7 | 2.3 |
| Tensile Modulus (psi) | 2.37E+05 | 2.52E+05 |
| Tensile Strength @ Yield (psi) | 3135 | 3218 |
| Tensile Strength @ Break (psi) | 2941 | 2914 |
| Tensile @ Max (psi) | 3145.7 | 3218.4 |
| Elongation @ Break (psi) | 39.7 | 42.7 |
| Break Type - Notched | Complete Break | Complete Break |
| Izod Impact - Notched (ft-lb/in) | 4.4 | 5.1 |
| Notched STDEV | 1.0 | 0.3 |
| Rubber Particle Size (μm) | 2.1 | 2.3 |
| Span | 1.2 | 1.2 |

A HIPS batch polymerization was also run with 250 ppm (relative to the feed) of tertiary amine oxide (Genox EP, dispersed in EB) delivered into the reaction 15 min before the end of batch polymerization. It was observed (Table 3) that both Izod impact resistance and tensile elongation of HIPS were higher, at comparable rubber content and rubber particle size but higher swell index.

TABLE 3

Physical Properties of HIPS Prepared Using Tertiary Amine Oxide (Genox EP) (45 min in devolitilization)

|  | Control | 250 ppm Genox |
|---|---|---|
| Swell Index | 14.8 | 27.0 |
| Gel Content (%) | 23.9 | 10.2 |
| Rubber Content (wt. %) | 9 | 9 |
| Mn | 116,832 | 120,233 |
| Mw | 245,765 | 251,549 |
| Mz | 390,970 | 399,734 |
| Polydispersity | 2.1 | 2.1 |
| Peak MW | 224,970 | 231,991 |
| Tensile Modulus (psi) | 2.78+05 | 2.77E+05 |
| Tensile Strength @ Yield (psi) | 3410 | 3252 |
| Tensile Strength @ Break (psi) | 3353 | 2882 |
| Tensile @ Max (psi) | 3560 | 3302 |
| Elongation @ Break (psi) | 21 | 29 |
| Break Type - Notched | Complete Break | Complete Break |
| Izod Impact - Notched (ft-lb/in) | 3.4 | 4.7 |
| Notched STDEV | 0.5 | 0.8 |
| RPS (μm) | 3.0 | 3.3 |
| RPS Span | 1.2 | 1.1 |

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
providing a high impact polystyrene (HIPS) reaction system, wherein the HIPS reaction system has a devolitalizer downstream of a reactor;
injecting a retarding agent into the HIPS reaction system prior to the devolitalizer, wherein the retarding agent comprises a free radical scavenger.

2. The method of claim 1, wherein the retarding agent further comprises a chain transfer agent.

3. The method of claim 2, wherein the chain transfer agent is a mercaptan, thiol, or halocarbon.

4. The method of claim 3, wherein the chain transfer agent is a mercaptan selected from the group consisting of n-octyl mercaptan, t-octyl mercaptan, n-decyl mercaptan, n-dodecyl mercaptan (NDM), t-dodecyl mercaptan, tridecyl mercaptan, tetradecyl mercaptan, n-hexadecyl mercaptan, t-nonyl mercaptan, ethyl mercaptan, isopropyl mercaptan, t butyl mercaptan, cyclohexyl mercaptan, benzyl mercaptan and mixtures thereof.

5. The method of claim 3, wherein the chain transfer agent is carbon tetrachloride.

6. A method comprising:
providing a high impact polystyrene (HIPS) reaction system, wherein the HIPS reaction system has a devolitalizer downstream of a reactor;
injecting a retarding agent comprising a chain transfer agent into the HIPS reaction system prior to the devolitalizer, wherein the chain transfer agent is ethylbenzene, and wherein a concentration of the retarding agent in a polymer melt prior to the devolitalizer is between 50 ppm and 1000 ppm.

7. The method of claim 1, wherein the free radical scavenger is a phenolic antioxidant.

8. The method of claim 1, wherein the retarding agent further comprises a crosslinking coagent.

9. The method of claim 8, wherein the crosslinking coagent is a polyfunctional (meth)acrylic monomer, allylic compound or metal salt of an unsaturated monocarboxylic acid.

10. A method comprising:
providing a high impact polystyrene (HIPS) reaction system, wherein the HIPS reaction system has a devolitalizer downstream of a reactor;
injecting a retarding agent into the HIPS reaction system prior to the devolitalizer, wherein the retarding agent is a tertiary amine oxide or a tertiary amine.

11. The method of claim 10, wherein the retarding agent is the tertiary amine oxide, wherein the tertiary amine oxide is N,N,N-trialkylamine oxide, and wherein one N is a methyl group and the other two Ns are $C_{14}$-$C_{24}$ saturated aliphatic chains.

12. The method of claim 10, wherein the retarding agent is the tertiary amine oxide, and wherein the tertiary amine oxide is co-injected with an aliphatic or aromatic solvent.

13. The method of claim 12, wherein the solvent is a heptane or ethylbenzene.

14. The method of claim 10, wherein the retarding agent is an aromatic tertiary amine oxide.

15. The method of claim 1, wherein the retarding agent is the tertiary amine, wherein peroxide and oxygen are present in the reaction system, and wherein the tertiary amine forms a corresponding tertiary amine oxide in the reaction system.

16. The method of claim 15, wherein the tertiary amine is 2,6-di-tert-butyl-4-(dimethylamino)methylphenol.

17. The method of claim 1, wherein the swell index of the HIPS 15 to 25 over that when no retardant is used.

18. The method of claim 1, wherein the concentration of the retarding agent in a polymer melt prior to the devolitalizer is between 1 ppm and 1% (by weight).

19. The method of claim 18, wherein the concentration of the retarding agent in the polymer melt prior to the devolitalizer is between 50 and 1000 ppm (by weight).

* * * * *